2 Sheets—Sheet 2.
J. J. HINES.
Cotton-Press.
No. 211,734. Patented Jan. 28, 1879.
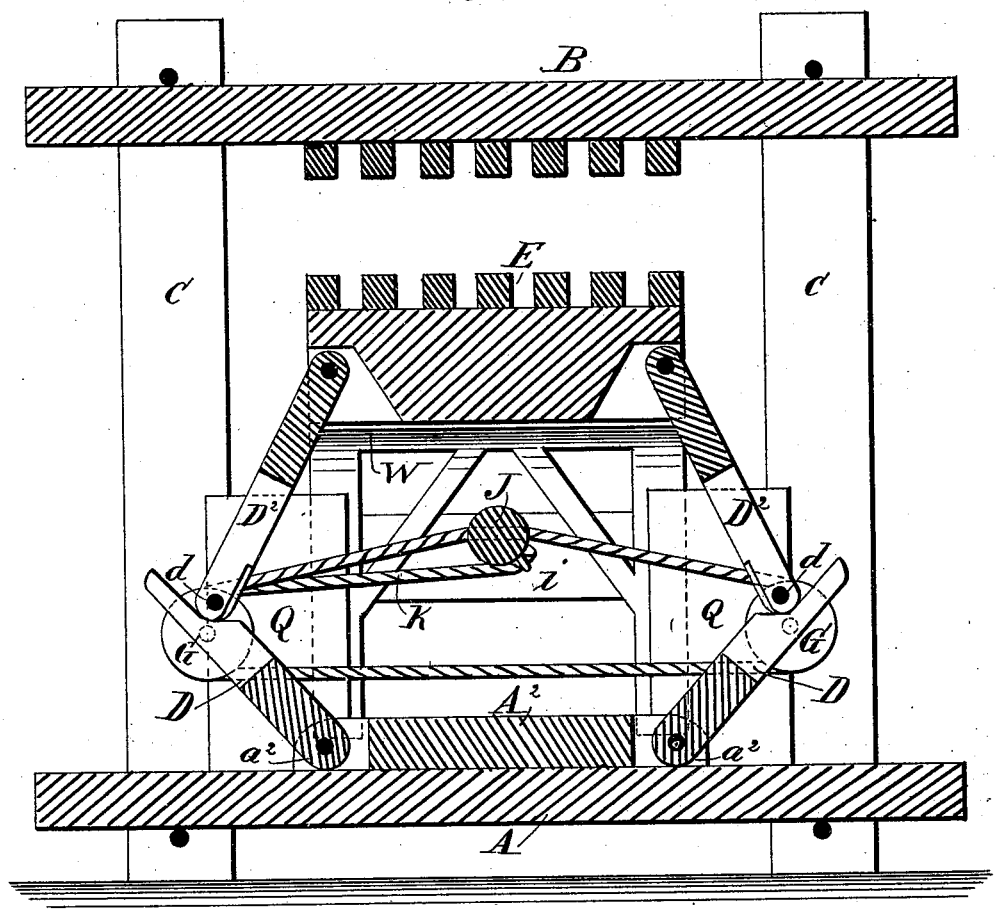
WITNESSES:
A. Schehl.
C. Sedgwick
INVENTOR:
J. J. Hines
BY Munn & Co
ATTORNEYS.

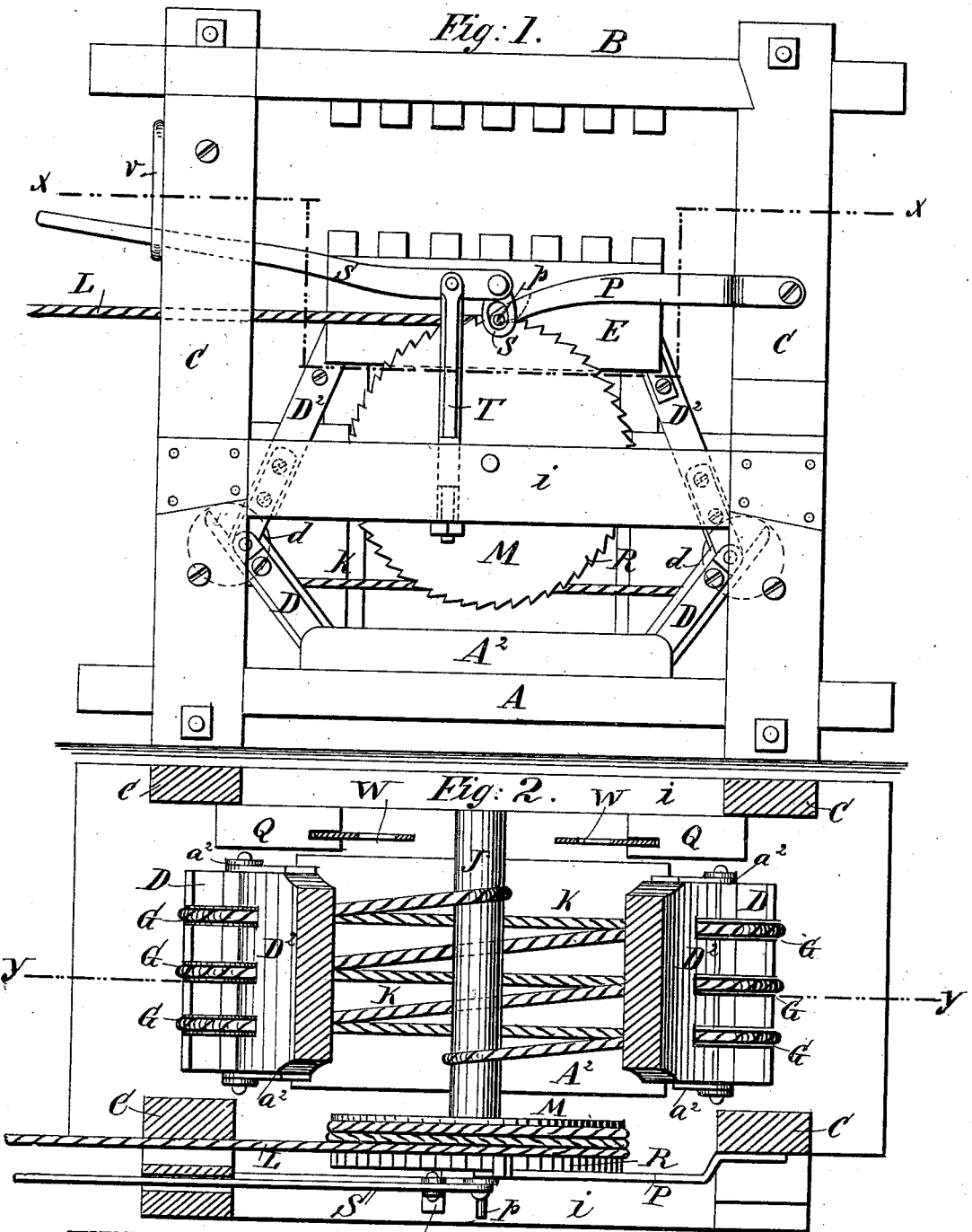

UNITED STATES PATENT OFFICE.

JAMES J. HINES, OF SAVANNAH, GEORGIA.

IMPROVEMENT IN COTTON-PRESSES.

Specification forming part of Letters Patent No. 211,734, dated January 28, 1879; application filed September 10, 1878.

*To all whom it may concern:*

Be it known that I, JAMES J. HINES, of Savannah, in the county of Chatham and State of Georgia, have invented a new and Improved Cotton-Press, of which the following is a specification:

My invention relates to a means for compressing bales of cotton previous to banding and tying the same, and, after being described in connection with the drawings, will be pointed out in the claims.

In the accompanying drawings, Figure 1 represents a side view of an apparatus embodying my improvements. Fig. 2 is a horizontal section taken in the line $x\ x$ of Fig. 1. Fig. 3 is a longitudinal vertical section taken in the line $y\ y$ of Fig. 2.

Similar letters of reference indicate corresponding parts.

The working parts of the apparatus are supported by a frame consisting of a horizontal base-board, A, and top board, B, and four upright posts, C, which posts are connected by dovetail-joints, and braced and strengthened by screw rods or bolts.

On the base-board A rests a plate or frame, $A^2$, of square or oblong form, provided at each end with lugs $a^2$, to which are pivoted the lower ends of toggles D, the upper ends of which are jointed at $d$ to the lower ends of toggles $D^2$, having their upper ends pivoted to the rising and falling bed or follower E. Near the knee or knuckle $d$ of each toggle-joint thus formed a pulley, G, is arranged.

Each toggle-joint may be formed of two wide pieces, with their contiguous edges notched and tenoned for engagement with each other; or a number of toggle-joints may be placed side by side, each consisting of two narrow pieces jointed together.

When the toggle-joint is formed of two wide pieces the pulleys G are arranged in notches formed in the upper edge of the lower piece, as shown. When it is formed of several narrow pieces the pulleys may be arranged between the contiguous knees of the different joints.

By means of the stops $d^1$ on the end of pieces D the inward pressure on the joint from the intermediate operative mechanism is relieved, while the peculiar mode of connecting the joint itself with the windlass through joint-pulleys and a chain or rope that passes alternately over a pulley and through the shaft causes the press to work easily, with less than the usual labor, and with much less liability to get out of order.

On two opposite sides of the apparatus two horizontal rails, $i\ i$, are attached to the upright posts C. In these rails a horizontal shaft, J, is journaled. A chain or a rope, K, has one end rigidly secured to the shaft J near one end. It is then passed around one of the pulleys G in the toggle-joint on one side of the apparatus; thence through a transverse hole in the shaft and around a pulley in the toggle-joint on the opposite side; thence through another transverse hole and around another pulley, and so on until it has been passed around all the pulleys in the two sets, whereupon the other end of the chain or rope is rigidly secured to the shaft J near the opposite end of said shaft. The chain or rope being thus secured to the shaft and passed around the pulleys, on turning the shaft J the chain or rope K is wound around said shaft, and the knees or knuckles $d\ d$ of the opposite toggle-joints are drawn toward each other, so as to straighten said joints and raise the bed or follower E.

For turning the shaft J to wind up the rope or chain I employ the following-described means: To one end of the shaft J is attached a drum or grooved wheel, M, having one end of a chain or rope, L, attached to its periphery and a portion wound around the same, the other end of said rope or chain being provided with means for connecting with a suitable power. When said rope or chain L is pulled in a direction to unwind it from the drum or wheel M the rope K is wound upon the shaft J, as before described.

To prevent backward movement of the drum or wheel M while being turned to wind the rope or chain K, I employ a pawl, P, pivoted to one of the posts C, and engaging with a ratchet, R, carried by the drum or wheel M. The free end of the pawl P is provided with a lateral arm, $p$, which engages with a ring or eye, $s$, on the short arm of a lever, S, pivoted in a post or standard, T, attached to one of the horizontal rails $i$. When the long arm of the lever S is depressed the pawl P is raised out of contact with the ratchet, and when said long arm is raised the pawl P drops and engages with the ratchet. A hook, $v$, is attached to one of the posts C, so that it may engage with the long arm of the lever S and hold it up.

For insuring the accurate vertical motion of the bed or follower, I attach thereto an iron frame-work or skeleton-plate, W, the vertical edges of which work in grooves in two supplementary posts or blocks, Q Q, attached to two of the posts C, on one side of the apparatus, and thus prevent any lateral vibration of the bed or follower.

Having thus described my invention, what I claim as new, and desire to secure by Letters Patent, is—

1. In a cotton-press, the wide pieces D $D^2$, notched and tenoned on their contiguous edges, having pulleys G arranged in said notches, and provided with outside projections or stops $d^1$ to cover the joint, in combination with a central windlass-shaft connected directly with said joints by a rope having the two ends secured near opposite ends of shaft J, and then passed alternately around the pulleys G, and through transverse holes of shaft, as and for the purpose specified.

2. The combination, with the bed or follower E, of the guide plate or frame W and grooved posts or blocks Q Q, substantially as shown and described.

JAMES JACKSON HINES.

Witnesses:
J. M. AGEE,
S. AGEE.